United States Patent

[11] 3,564,135

[72] Inventor Paul K. Weimer
Princeton, N.J.
[21] Appl. No. 674,859
[22] Filed Oct. 12, 1967
[45] Patented Feb. 16, 1971
[73] Assignee RCA Corporation

[54] INTEGRATED DISPLAY PANEL UTILIZING FIELD-EFFECT TRANSISTORS
2 Claims, 4 Drawing Figs.

[52] U.S. Cl. .......... 178/7.3; 315/169; 307/303; 307/304
[51] Int. Cl. .......... H04n 3/14
[50] Field of Search .......... 178/7.3 (D), 7.3 (E), 7.5 (D) (Cursory), 5.4 (EL), 6 (A), 6 (LMS); 313/108 (B); 315/(FTD), 169, 169(TV); 307/279, 303, 304

[56] References Cited

UNITED STATES PATENTS

| | | | |
|---|---|---|---|
| 2,818,531 | 6/1954 | Peek, Jr. .......... | 178/6A |
| 2,904,626 | 9/1959 | Rajchman et al. .......... | 178/7.3D |
| 3,379,831 | 4/1968 | Hashimoto .......... | 178/7.3D |
| 3,191,061 | 6/1965 | Weimer .......... | 307/279 |
| 3,383,570 | 5/1968 | Luscher .......... | 307/279 |
| 3,388,292 | 6/1968 | Burns .......... | 315/169 |
| 3,447,103 | 5/1969 | Port .......... | 307/279 |

*Primary Examiner*—Richard Murray
*Assistant Examiner*—George G. Stellar
*Attorneys*—Eugene M. Whitacre and William H. Meagher

ABSTRACT: Elemental units are arranged in rows and columns. Each elemental unit has a light cell which is controlled by voltage developed across an associated storage capacitance that is connected to a source of video signals by a dual gate field effect transistor. Scanning is achieved by application of pulses of line and elemental duration to the gate electrodes of the transistors. The invention herein described was made in the course of or under a contract with the Department of the Air Force.

INVENTOR
Paul K. Weimer
BY William H. Meagher
ATTORNEY

INVENTOR
Paul K. Weimer

BY William H. Meagher
ATTORNEY

INTEGRATED DISPLAY PANEL UTILIZING FIELD-EFFECT TRANSISTORS

This invention relates to a thin picture display panel that has light cells arranged in rows and columns and wherein the light emerging from each cell is individually controlled.

In order to produce pictures of reasonable size and resolution for home television receivers, approximately a half million cells are generally required, one for each element of the picture to be produced. At the present state of the art, the peak intensity of the light emerging from each cell is so low that pictures of satisfactory brightness can be produced only if light of the required relative intensity emerges from each cell for a major portion of the frame scanning period.

It is, therefore, an object of this invention to provide an improved display panel in which light emerges from each cell at a desired relative intensity for a major portion of a frame scanning period.

Heretofore, display panels constructed with a plurality of elemental cells have been so complex as to make their fabrication difficult and costly.

Accordingly, it is another object of this invention to provide an improved picture display panel having individually controllable elemental light cells that is constructed in such manner as to lend itself to mass production techniques, thereby reducing the cost of manufacture.

These objectives can be achieved in accordance with this invention by controlling the light emerging from each cell with a voltage developed across an associated storage capacitance by periodically charging or discharging the capacitance from a source of video signals. In order that the panels can be fabricated by techniques suitable for mass production, each capacitance is charged or discharged through a pair of serially connected switches which may be comprised of one dual gate field effect transistor or two single gate field effect transistors connected in series. In either case one gate electrode of each of the pairs of switches in each row are connected together by separate row busses and the other gate electrodes of each of the pairs of switches in each column are connected together by separate column busses. Pulses having the duration of a line scanning period are successively applied to the row busses so as to bias the gate electrodes connected to these busses for conduction, and pulses having an elemental duration are successively applied to the column busses so as to bias the gate electrodes connected to these busses for conduction. In this way the pairs of switches associated with cells in each row are successively closed during successive elemental periods occurring during the line scansion period corresponding to that row.

The storage capacitance may be formed by separate means or it may be comprised of the inherent capacitance of the cell itself. With some types of cells the voltage across the associated capacitance can be used directly to control the intensity of the emerging light but with other types of cells it may be necessary to effectively amplify it, as for example, by applying it to a gate electrode of a field effect transistor that is connected with its source and drain electrodes in series with the cell and a suitable power supply. It is important that the RC time constant of the storage capacitance and the source of video signals be small enough to permit the required amount of charge or discharge to take place in the elemental interval during which both the aforementioned switches are closed. In order to maintain the intensity of the light emerging from each cell at a desired relative intensity for as much of a frame scanning period as possible, the RC time constant of the discharge path of each storage capacitance is made relatively high and should exceed the storage period.

The use of field effect transistors as switches or, in some cases, additionally, as amplifiers, and storing by means of capacitances, makes it possible to use thin film techniques in forming the various components by of a panel on an insulating substrate such as glass. It is also possible to form the various components by crystal growing techniques wherein the field effect transistors may be formed by growing silicon crystals onto a sapphire substrate. When thin film techniques are used, the various components may be formed by evaporating the required material in sequential steps through appropriate masks, and when crystal growth techniques are employed, the required crystal growth may be made over the entire surface and then etched s away from areas where it is not desired. Regardless of which of these techniques are used, the conductive busses, the electrodes for the transistors and the light cells, and the conductive areas forming the plates of the storage capacitances can be formed by evaporation techniques.

The invention, both as to its organization and manner of operation may best be understood by reference to the following description taken in conjunction with the drawings in which.

Figure 2B:
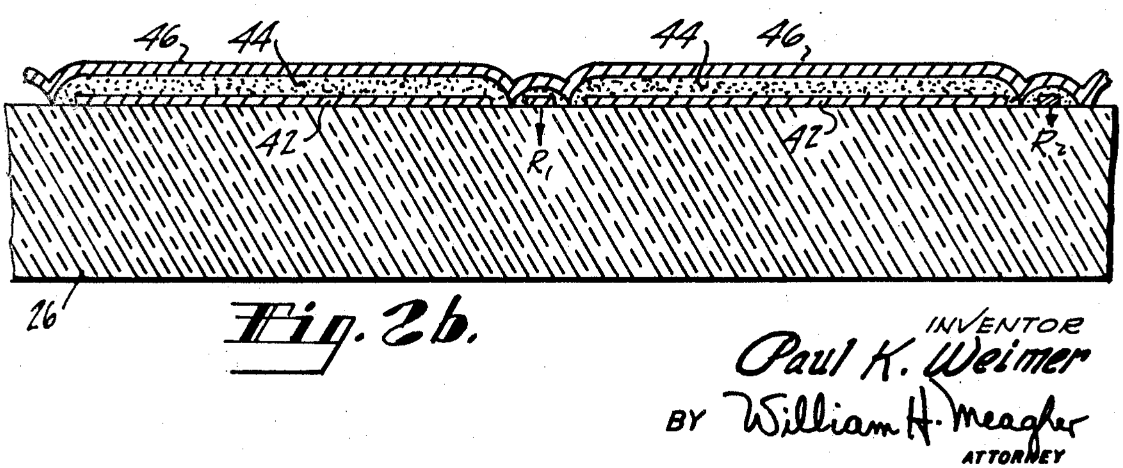
FIG. 2 shows the plan view of four cells of a panel.
Figure 2:
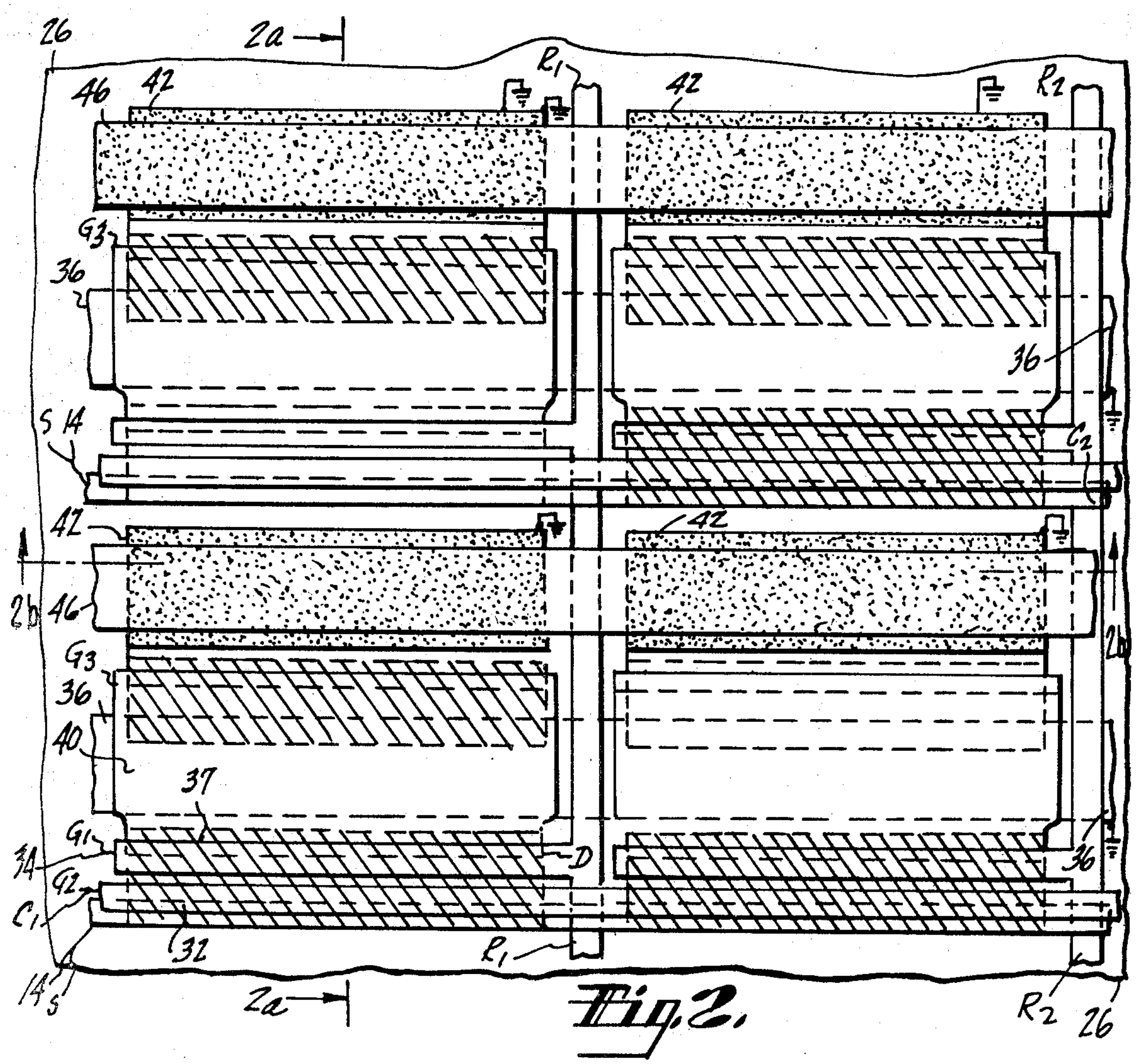
Figure 2A:
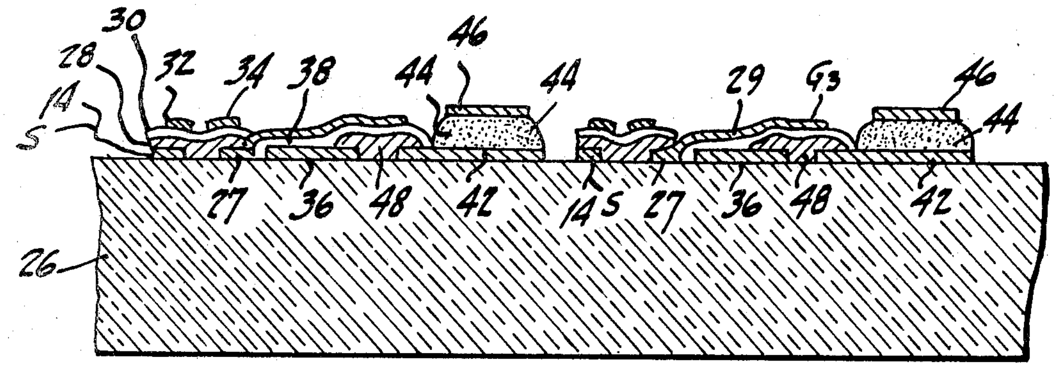

FIG. 2*A* is a cross section of FIG. 2 at AA; and

FIG. 2*B* is a cross section of FIG. 2 at BB.

Figure 1:
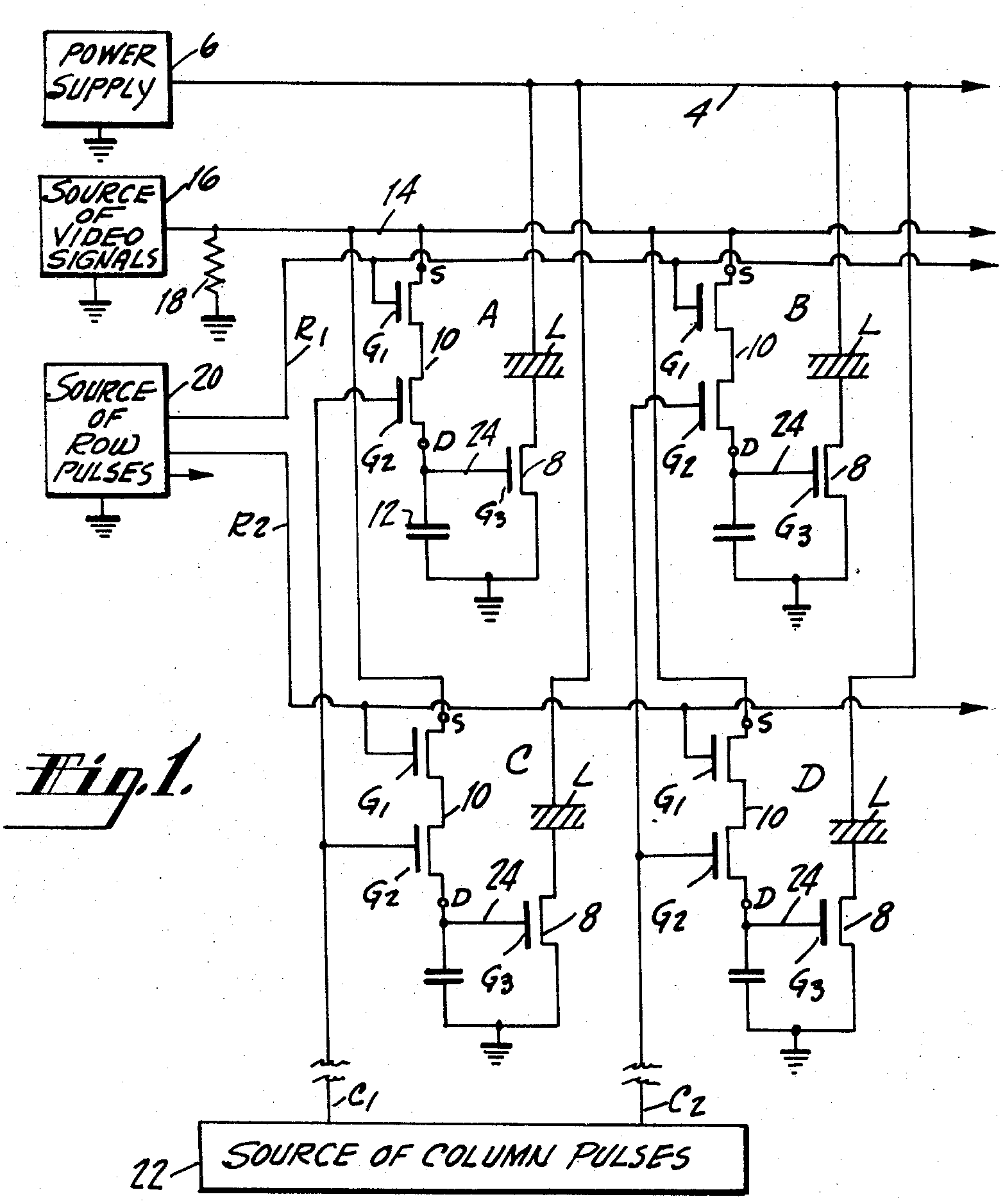
FIG. 1 illustrates the circuit configuration of four cells of a panel.

FIG. 1 illustrates the control circuits for four elemental light cell units *A*, *B*, *C* and *D*. Units *A* and *B* are in one horizontal row, or line, of the panel and units *C* and *D* are in an adjacent row or line. Units *A* and *C* are in a first vertical column and units *B* and *D* in an adjacent column. Each of the units comprises a light cell *L* and control means therefore. Each light cell *L* is connected to a power supply bus 4 from a source 6 of DC, pulsed DC, or AC voltage depending on the type of light cells *L* used. Voltage controlled variable impedance means, herein illustrated as single gate field effect transistors 8, are respectively connected in series with each of the light cells *L* between the power supply bus 4 and ground. The impedance of the transistors 8, and hence the intensity of the light produced by the cell *L* respectively in series with each transistor is independently controlled by dual gate field effect transistors 10 having their source electrodes *S* and the drain electrodes *D* connected in series with storage capacitors 12 between a video signal bus 14 and ground. Two single gate field effect transistors could, of course, be substituted for each dual gate transistor. Video signals are developed by a source 16 across a resistor 18 of low value, which is connected between the video signal bus 14 and ground. The gate electrodes $G_1$ of the transistors 10 that are in the light cell units in each row, e.g. *A*, *B*, and *C*, *D*, are respectively connected to separate row pulse busses $R_1$ and $R_2$. Each bus is provided by a source 20 with pulses that bias the gates $G_1$ connected to that bus for conduction during a different line scanning interval. The gate electrodes $G_2$ of the transistors 10 of each vertical column, e.g. those associated with cells *A*, *C* and *B*, *D*, respectively, are connected to separate column busses $C_1$ and $C_2$ that are successively provided by a source 22 with pulses of an elemental duration that bias the gates $G_2$ for conduction. Current flows from the video bus 14 through a transistor 10 to its associated storage capacitor 12 only when both gates $G_1$ and $G_2$ are biased for conduction. Hence during one line scansion, all of the gates $G_1$ of one row are biased for conduction and the gates $G_2$ are successively biased for conduction in elemental sequence along the line or row. During the elemental period when both gates $G_1$ and $G_2$ are biased for conduction, the associated storage capacitor 12 is charged or discharged to the voltage which the video signal has during that particular elemental interval.

The voltage across the storage capacitors 12 is applied by conductors 24 to the gate electrodes $G_3$ of the transistors 8 so as to control their resistance. This controls the current flowing through the light cells *L* and hence the intensity of the light produced by the cells. Except for an insignificant amount of inherent leakage, there are no discharge paths for the storage capacitors 12 so that they hold their charge until it is altered during the next frame when the gates $G_1$ and $G_2$ are both biased for conduction. Thus, light emerges from each light cell with a proper relative intensity for a whole frame interval, and even though the maximum light intensity is low, the integrated effect on the eye during the frame interval produces a bright image.

The light cells can be any type which emits light under the control of a voltage, e.g. electroluminescent or cells which generate light or liquid crystal cells which control the passage of light through them. In either case, light emerging from them is controlled by the voltage to which the corresponding capacitance 12 is charged.

Reference is now made to FIGS. 2, 2*A* and 2*B* for a description of one physical form of a portion of a panel having the various components and circuit connections illustrated in FIG. 1. Corresponding parts in the various figures are indicated by the same numerals.

The circuits, components and active devices shown in FIG. 1 may be formed on a transparent insulating glass substrate 26 by evaporation or silk screening techniques. The video signal busses 14 are in the form of spaced parallel vertical conducting strips that extend from the top to the bottom of the panel and, although not shown, the strips are all electrically connected to the video signal source 16 of FIG. 1. The strips 14 also serve as the source electrodes *S* for each of the separate dual gate transistors 10. The drain electrodes *D* of these transistors are formed by edge portions 27 of metallic sheets 29 associated with each elemental unit. The edge portions 27 of each sheet 29 are adhered to the substrate 26 in spaced parallel relationship with the strips 14. The body, or field effect transistor channels, of each of the dual gate transistors 10 may be formed by evaporation in separate elemental areas of layers 28 of semiconductor material such as *CdSe* doped with indium. Each layer 28 overlies and makes electrical contact with a strip 14 and an edge 27 of a sheet 29. A layer 30 of insulating material such as *Si*O overlies each elemental area of semiconductor material 28. Vertical strips 32 of conducting material, which are mounted on top of the insulating material 30, and which extend throughout the height of the panel, serve as the gates $G_2$ for all of the transistors 10 in each vertical column. The strips 32 also serve as the column busses $C_1$, $C_2$ etc. that convey the column pulses of elemental duration from the separate outputs of the source 22, shown in FIG. 1. Separate vertical strips 34 for each elemental unit, which are mounted parallel to the strips 32 on the insulation layer 30 serve as the gate electrodes $G_1$, for each of the transistors 10. As seen in FIG. 2, the ends of the strips 34 in horizontal rows of elemental units are respectively connected to row pulse busses $R_1$ and $R_2$.

The grounded plates of the storage capacitors 12 are formed by vertical strips 36 of conductive material that are mounted on and, which extend throughout the height of the substrate 26. A layer 38 of dielectric material, which may be continuous or limited to the height of each elemental unit, overlies the strips 36. The other plates of the capacitors 12 are formed by the portions of the separate sheets 29 which extend over the dielectric layers 38.

Formation of the light cells *L* may be accomplished by depositing separate conductive layers 42 for each elemental cell on the substrate 26, by covering a portion of each with electroluminescent material 44, and by superimposing thereon vertical conducting strips 46 that extend throughout the height of the panel. The strips 46 are connected to the power supply 6, shown in FIG. 1.

The single gate control transistors 8 for each elemental unit are formed by depositing semiconductor material 48 such as *CdSe* so as to bridge the gap between the grounded plates 36 of the capacitors 12 and the conductive layer 42 of the associated light cell and by extending both the dielectric material 38 and the sheet 29 of the capacitors 12 over the material 48. These extensions of the sheets 29 form the gate electrodes $G_3$ of the transistors 8 as well as the connections 24.

FIG. 2*B* is a section BB through FIG. 2 which shows in cross section the conductors 42 and 46 on either side of the light cells *L* as well as the row busses $R_1$ and $R_2$. If the image is to viewed through the substrate 26, the conductors 42 would be made of a transparent film such as tin oxide or thin evaporated gold and the conductors 46 could be made of suitable metal so as to reflect the light. If the panel is to be viewed from the other side, the conductors 46 should be transparent.

I claim:

1. A display panel comprising in combination:
a substrate of electrical insulating material;
elemental light cell units mounted in rows and columns on said substrate;
each of said light cell units being comprised of:
a. first, second, third and fourth parallel spaced conductors mounted on said substrate,
b. a layer of semiconductor material overlying at least a portion of said first and second conductors,
c. a layer of insulating material overlying said semiconductor material, and spaced areas of conductive material mounted on said layer of insulated material so as to form the gate electrodes of a dual gate field effect transistor,
d. a layer of insulating material on said third conductor and a layer of conductive material which is a first extension of said second conductor, mounted on a portion of said latter layer of insulating material so as to form a storage capacitor,
e. a layer of semiconductor material mounted on said substrate and extending over the adjacent edges of said third and fourth conductors,
f. a layer of insulating material mounted on the layer of semiconductor material described in (e) above,
g. a conductive layer, which is a second extension of said second conductor mounted on said latter layer of insulating material so as to form a single gate field effect transistor,
h. a layer of electroluminescent material mounted on said fourth conductor, and a layer of conductive material mounted on said electroluminescent material so as to form a light cell,
i. means coupled to said spaced conductive areas described in (c) above causing the semiconductive material overlying said first and said second conductors to be capable of passing current during predetermined periods of time,
j. means coupling said third conductor to a fixed reference potential,
k. power supply means coupled to said layer of conductive material mounted on said electroluminescent material described in (h) above, and
l. a source of video signals coupled to said first conductor whereby the intensity of the light emerging from said electroluminescent material is related to said video signal voltage during said predetermined time.

2. A panel as set forth in claim 1 wherein:
a. said first, third and fourth conductors of each column of light cell units are extended so as to make electrical connection with each other;
b. electrical connections between one of said gates of said dual gate field effect transistors of the elemental light cell units of each row; and
c. electrical connections between the other of said gates of said dual gate field effect transistors of said elemental light cell units of each column.